(12) United States Patent
McConnell

(10) Patent No.: US 10,517,054 B2
(45) Date of Patent: *Dec. 24, 2019

(54) CLOCK SYNCHRONISATION IN WIRELESS MESH COMMUNICATION NETWORKS

(71) Applicant: BLUWIRELESS TECHNOLOGY LIMITED, Bristol (GB)

(72) Inventor: Ray McConnell, Bristol (GB)

(73) Assignee: BLUWIRELESS TECHNOLOGY LIMITED, Bristol (GB)

(*) Notice: Subject to any disclaimer, the term of this patent is extended or adjusted under 35 U.S.C. 154(b) by 97 days.

This patent is subject to a terminal disclaimer.

(21) Appl. No.: 15/618,761

(22) Filed: Jun. 9, 2017

(65) Prior Publication Data

US 2017/0359792 A1 Dec. 14, 2017

(30) Foreign Application Priority Data

Jun. 10, 2016 (GB) .................................. 1610134.7

(51) Int. Cl.
| | |
|---|---|
| *H04W 56/00* | (2009.01) |
| *H04L 29/06* | (2006.01) |
| *H04B 7/02* | (2018.01) |
| *H04B 7/08* | (2006.01) |
| *H04W 84/18* | (2009.01) |

(52) U.S. Cl.
CPC .......... *H04W 56/0015* (2013.01); *H04B 7/02* (2013.01); *H04B 7/0848* (2013.01); *H04L 69/22* (2013.01); *H04W 84/18* (2013.01)

(58) Field of Classification Search
CPC .. H04W 56/001; H04W 56/0015; H04B 7/02; H04B 7/0848; H04L 69/22
See application file for complete search history.

(56) References Cited

U.S. PATENT DOCUMENTS

| | | | | |
|---|---|---|---|---|
| 2010/0046441 A1* | 2/2010 | Vermani | ............... | H04L 1/1685 370/329 |
| 2010/0128713 A1* | 5/2010 | Le Bars | ............... | H04B 7/0851 370/347 |
| 2013/0039220 A1* | 2/2013 | Ruffini | .................. | H04J 3/0641 370/255 |
| 2014/0341261 A1* | 11/2014 | Weiler | .................... | H01Q 3/40 375/219 |
| 2015/0171980 A1* | 6/2015 | Bui | ......................... | H04L 43/10 370/393 |
| 2017/0244451 A1* | 8/2017 | Raghavan | ............ | H04B 7/0408 |

* cited by examiner

*Primary Examiner* — David B Lugo

(74) *Attorney, Agent, or Firm* — Mossman, Kumar & Tyler, PC

(57) ABSTRACT

A technique for providing a synchronised clock signal across a wireless mesh network is described. The technique includes choosing one of a plurality received radio frequency signals to provide a synchronisation signal to which a local clock signal can be synchronised.

31 Claims, 15 Drawing Sheets

CLOCK SYNCHRONISATION IN WIRELESS MESH COMMUNICATION NETWORKS

CROSS-REFERENCE TO RELATED APPLICATIONS

This application claims priority from United Kingdom Application No.: 1610134.7, filed Jun. 10, 2016, the entire disclosure of which is incorporated herein by reference in its entirety.

The present invention relates to clock synchronisation in wireless mesh communications networks.

BACKGROUND OF THE INVENTION

FIG. 1 of the accompanying drawings illustrates a simplified example wireless mesh communications network which provides a multipath connection between a base network 14 and a cell 16 of a cellular wireless telecommunications network. The wireless mesh network comprises a plurality of network nodes 10 interconnected by bidirectional wireless communications links 12. The network nodes 10 operate to communicate with one another for the transfer of communications data therebetween. This type of network is known as a "mesh" network because of the multiple connections between network nodes that defines a mesh of communications links 12. One particular mesh network makes use of wireless communications links that operate in the millimetre waveband, for example around 60 GHz.

Such a mesh network is suitable for providing a cell 16 of a cellular wireless telecommunications network with a connection to a fibre optic network connection 15 for communication with the base network 14. The cell 16 is operable to communicate with a plurality of mobile communications devices in accordance with well-known standards and techniques. For example, the Long Term Evolution (LTE) standard defines one suitable cellular communications technique.

In the example of FIG. 1, a first network node $10_1$ is connected with a base network 14 using an optical connection 15. The connection between the first network node $10_1$ and the base network 14 may be provided by any suitable connection technology. The mesh network provides a connection between the first network node $10_1$ and a second network node $10_2$. The second network node is connected with a cell station that defines a cell 16 of a cellular communications network. The mesh network provides communication for data from the cell 16 to other devices within or without the mesh network. Such a mesh network is known as a "backhaul" network.

In order for the cellular network to operate correctly, it is important that the cells of the network maintain a synchronous clock signal. Accordingly, it is necessary for the individual cells to maintain a clock signal that is synchronised with a master clock signal for the cellular network concerned. In addition, it is desirable for the individual network nodes to have access to a master reference clock signal in order that mobile phone cell to cell interference and signal management can be completed accurately.

One of the challenges associated with implementing a mesh network, particularly a wireless mesh network over a wide area, is that of maintaining such accurate and synchronised clock signals over the network. However, previously-considered network techniques for adjusting clock signal synchronisation are not ideally suited to wireless mesh networks, since the nature of multi-hop wireless connections mean that the clock signals can quickly become asynchronous.

Accordingly, it is desirable to provide a new technique that seeks to address the drawbacks of previously-considered clock synchronisation techniques.

SUMMARY OF THE INVENTION

According to one aspect of the present invention, there is provided a method of synchronising a local clock signal with a reference clock signal in a first network node of a wireless mesh communications network which includes a plurality of such network nodes interconnected by another plurality of wireless communications links, the method comprising, at the first network node, receiving a plurality of radio frequency signals at a beamforming steerable antenna having reception parameters that define a reception direction for the antenna, each received radio frequency signal having a direction; selecting one of the received radio frequency signals as a synchronisation signal by adjusting the reception parameters of the steerable antenna; producing a digital data stream from the synchronisation signal using a local clock signal; extracting a reference clock signal from the digital data stream; producing a reference comparison value by comparing the reference clock signal with the local clock signal; and adjusting the local clock signal in dependence upon the reference comparison value.

According to a second aspect of the present invention, there is provided a network node for use in a wireless mesh communications network which includes a plurality of such network nodes interconnected by another plurality of wireless communications links, the network node comprising, a receiver operable to receive a plurality of radio frequency signals at a beamforming steerable antenna having reception parameters that define a reception direction for the antenna, each received radio frequency signal having a direction; a controller operable to select one of the received radio frequency signals as a synchronisation signal by adjusting the reception parameters of the steerable antenna; a baseband unit operable to produce a digital data stream from such a synchronisation signal using a local clock signal; and a processing unit operable to extract a reference clock signal from such a digital data stream, and to produce a reference comparison value by comparing the reference clock signal with such a local clock signal, and to adjust the local clock signal in dependence upon such a reference comparison value.

In one example, adjusting the local clock signal is determined by the source of the synchronisation signal.

In one example, selecting the radio frequency signal is determined by the source of that radio frequency signal. In one example, the source of the radio frequency signal is determined by reference to media access control data.

In one example, selecting one of the received radio frequency signals comprises adjusting the reception parameters of the steerable antenna in accordance with a predetermined timing schedule. Such an example may further comprise, at a second network node of the wireless mesh communications network selecting a clock signal; generating a radio frequency clock synchronisation signal in dependence upon the selected clock signal; transmitting the radio frequency clock synchronisation signal to the first network node from a beamforming steerable antenna having transmission parameters which define a transmission direction to the first network node, such transmission including adjusting the transmission parameters of the steerable antenna, wherein adjustment of the transmission parameters is performed in accordance with the predetermined timing schedule.

In one example, the data stream comprises a plurality of data packets, each data packet including a preamble portion, and a payload portion, and wherein extracting a reference clock signal includes extracting clock signal information from the preamble portion of a data packet.

In one example, the preamble portion includes a channel estimation field and a short training field, and wherein the clock signal information is extracted from the channel estimation field and short training field.

In one example, extracting a reference clock signal includes extracting clock signal information from the payload portion of a data packet.

In one example, the data stream comprises a plurality of data packets, each data packet including a preamble portion, and a payload portion, and wherein extracting a reference clock signal comprises extracting clock signal information from the preamble portion of a data packet to provide a preamble clock signal, and extracting clock signal information from the payload portion of the data packet to provide a payload clock signal, and wherein producing a reference comparison value comprises comparing the preamble clock signal with the local clock signal to produce a first comparison value; comparing the payload clock signal with the local clock signal to produce a second comparison value; and combining the first and second comparison signals to produce the reference comparison value.

In one example, the synchronisation signal is a data transfer signal.

In one example, the synchronisation signal is a dedicated clock synchronisation signal. In one example, the dedicated clock synchronisation signal is selected at predetermined time intervals. In one example, the dedicated clock synchronisation signal employs a modulation and coding scheme that enables the dedicated clock synchronisation signal to have greater range than a data transfer signal.

In one example, selecting one of the received radio frequency signals is controlled by a central controller of the wireless mesh communications network. In one example, selection of the received radio frequency signal is performed according to a timing schedule defined by the central controller. In one example, the central controller is a software defined network controller.

In one example, the network node comprises a plurality of beamforming steerable antennas having respective reception parameters that define respective reception directions for the antennas, and wherein selecting the synchronisation signal includes selecting one radio frequency signal received by one of the plurality of steerable antennas. In one example, selecting the synchronisation signal includes selecting respective radio frequency signals for the steerable antennas.

According to another aspect of the present invention, there is provided a method of synchronising respective local clock signals of network nodes of a wireless mesh communications network which includes a plurality of such nodes interconnected by another plurality of wireless communications links, each node having at least one transceiver having a beamforming steerable antenna and operable to transmit and receive radio frequency signals in distinct signal beams having respective directions, the method comprising at a first network node: selecting a clock beam direction of the beamforming steerable antenna of the first network node; receiving a master clock signal on a radio frequency signal received by the beamforming antenna in the clock beam direction; synchronising a local clock signal of the first network node with the master clock signal; selecting a synchronisation beam direction of the beamforming antenna of the first network node; and forwarding a first synchronisation signal to a second network node on a radio frequency signal transmitted from the beamforming antenna in the synchronisation beam direction of the first network node, the first synchronisation signal being dependent upon one or both of the local clock signal of the first node and the master clock signal; at a second network node: selecting a synchronisation beam direction of the beamforming steerable antenna of the second network node; receiving the first synchronisation signal from the first network node on a radio frequency signal received by the antenna in the synchronisation beam direction of the second network node; and synchronising a local clock signal of the second network node with the first synchronisation signal, the first and second network nodes thereby forming a first clock region of the wireless mesh network.

DETAILED DESCRIPTION OF THE PREFERRED EMBODIMENTS

Figure 1:
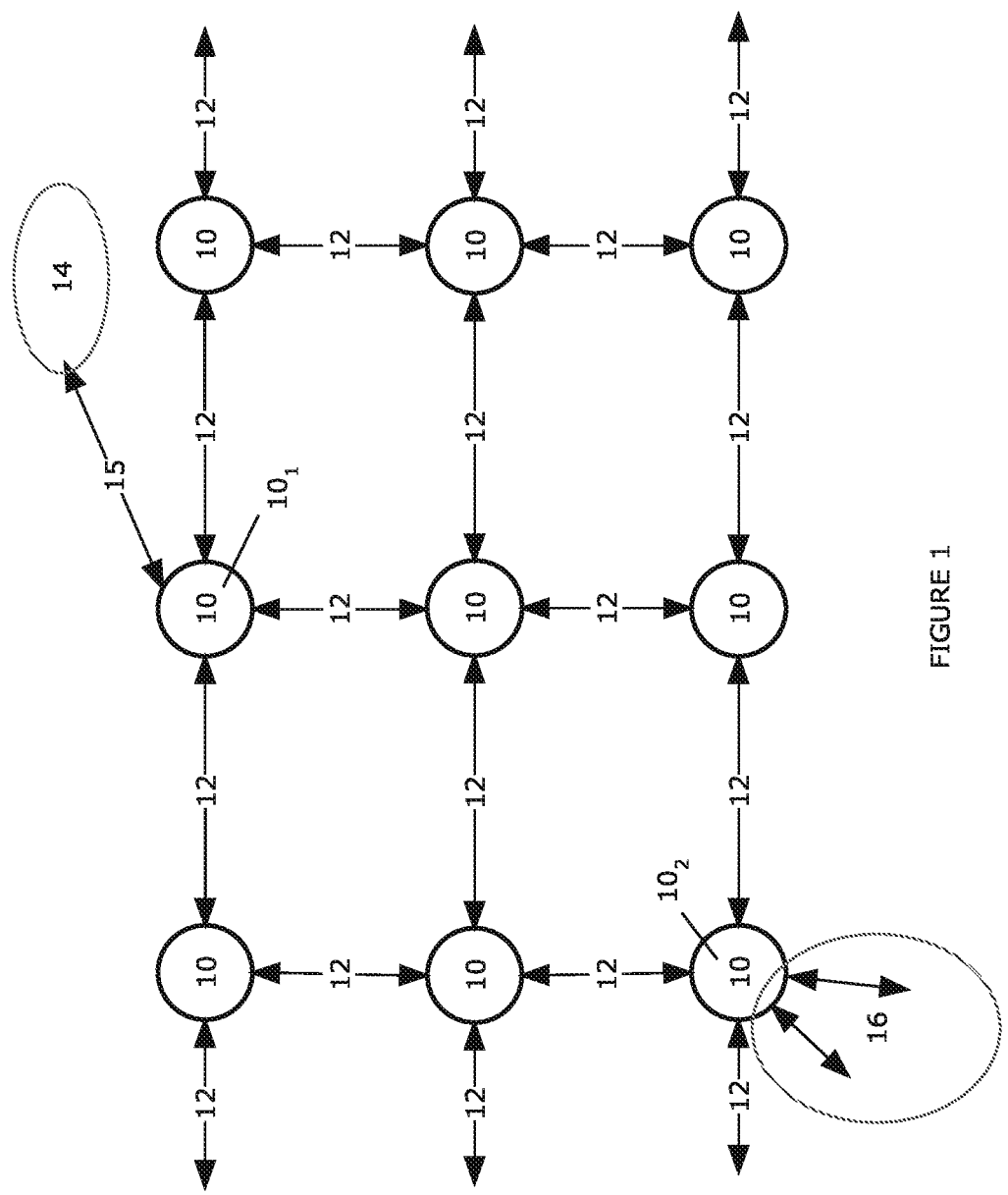
FIG. 1 is a schematic block diagram illustrating a wireless mesh communications network.
Figure 2:
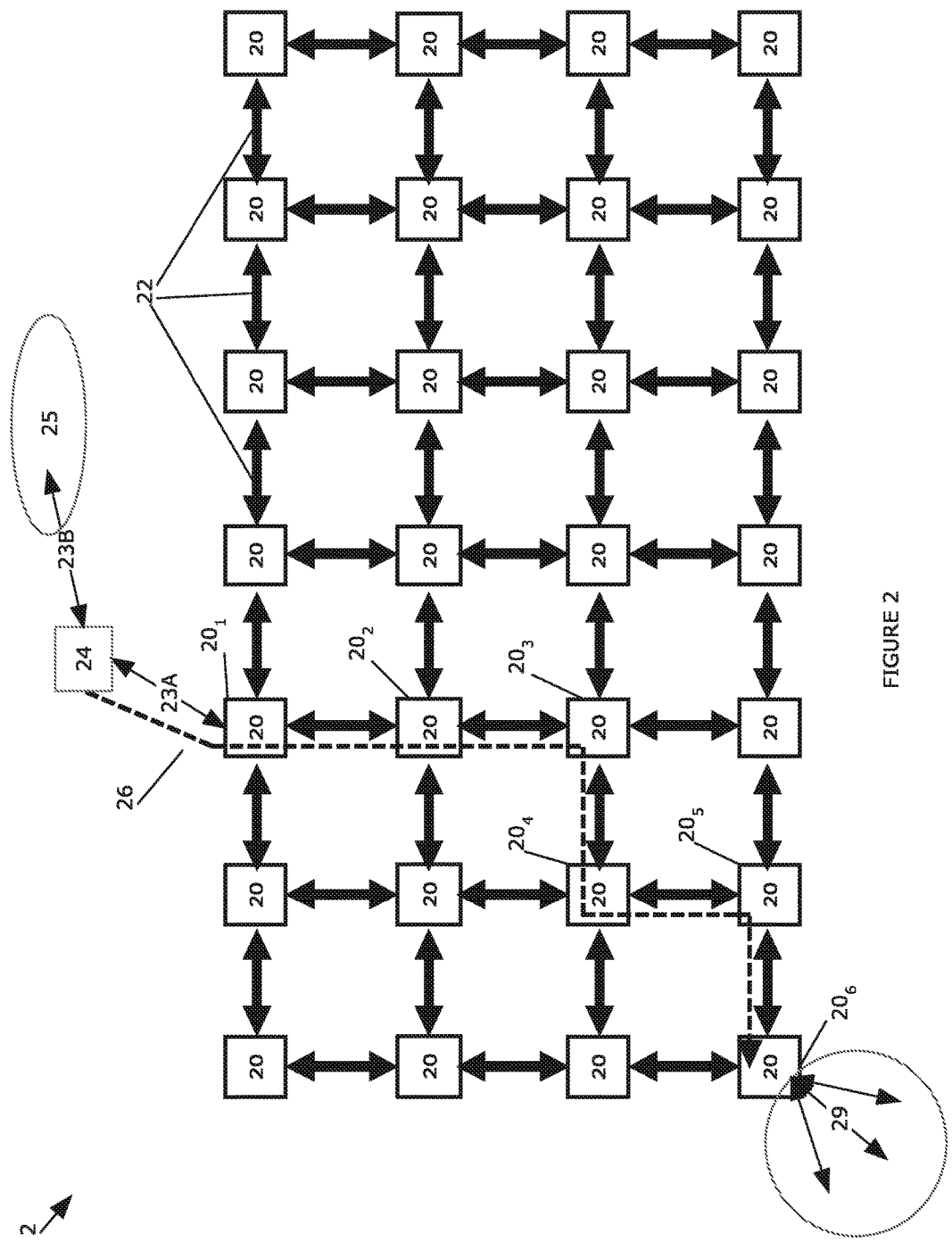
FIG. 2 illustrates one example of clock synchronisation across a wireless mesh communications network.

FIG. 2 illustrates clock synchronisation across a wireless communications network in accordance with an aspect of the present invention. The example network 2 of FIG. 2 has a similar topology to that shown in FIG. 1. It is to be understood that the network topologies shown in FIGS. 1 and 2 are merely exemplary, and do not have an impact on the techniques to be described below; the techniques are applicable to any wireless mesh network topology.

In the example of FIG. 2, a first plurality of network nodes 20 are interconnected by a second plurality of wireless communications links 22. The network nodes 20 are shown arranged in a regular grid (rectilinear) pattern with communications links 22 between adjacent network nodes 20. The network nodes 20 may be arranged in any suitable topology, and the communications links 22 may be arranged appropriately.

In a preferred example, the wireless communication links 22 are radio frequency links, using radio frequency signals in the millimetre wave range, that is in the range 20 GHz to 315 GHZ, preferably in the 60 GHZ waveband (as defined by the IEEE 802.1 lad standard and typically in the range approximately 58 GHz to 64 GHz).

The network 2 also includes a node 24 which connects the mesh network to a base network 25. This node 24 is also known as a "point of presence (POP)" node. Such a POP node 24 is typically connected with a first network node $20_1$ by way of a wired or optical connection 23A. The POP node 24 is connected to the base network 25 by way of a wired or optical connection 23B. The base network may be provided by any suitable communications network, such as a mobile network operator's packet data network or the Internet.

The POP node 24 provides a clock signal for the mesh and cellular networks, this clock is derived from a master clock signal is also known as a Grand Master (GM) clock signal. The GM clock signal can be generated locally or provided by the mobile network operator's packet data network. The POP node 24 provides the master clock signal to the first network node $20_1$. As will be described below, the master clock signal is used to provide a reference clock signal across the mesh network, and to a cell of destination network node $20_6$ in particular. FIG. 2 shows a single example clock sync path 26 over which the master clock signal travels to the destination network node $20_6$.

In the example clock sync path 26, the POP node 24 supplies the master clock signal to a first node $20_1$. The first node $20_1$ synchronises its internal clock with the received master clock signal, as will be described below, and passes the master clock signal to a second node $20_2$. This process is repeated until the master clock signal reaches a predetermined destination node. In the example shown in FIG. 2, the reference clock signal passes through first to sixth network nodes $20_1$, $20_2$, $20_3$, $20_4$, $20_5$, and $20_6$, with the sixth network node $20_6$ being the destination node 20 for the clock signal being distributed across the network. Each network node may have the opportunity to receive more than one reference clock signal from adjacent network nodes, and in that case a network node selects a reference clock signal with which it synchronises. In this way, a master clock signal can be distributed across selected network nodes 20 of the network 2. It will be appreciated that there may be different clock sync paths across the network 2.

The destination network node $20_6$ provides packet data and synchronisation clock to a cell 29 for a cellular communications network device. The cell is able to communicate in a wireless manner using appropriate cellular technologies and techniques. The cell 29 makes use of the master clock signal delivered by the mesh network in order to maintain synchronicity with the cellular communications network of which it is part.

The clock sync path (or "tree") 26 can be defined by an appropriate network resource. For example, in a software defined network (SDN), a suitably modified SDN controller may be responsible for the definition of the clock sync path. The definition and choice of the clock sync path 26 may be dynamic and respond to changes in the mesh network 2, and in the requirements for clock distribution. For example, a particular network node on a defined clock sync path may become inactive or faulty in some way. In such a case the controller may define a new clock sync path to bypass the network node concerned. This redefinition of clock sync paths is particularly suitable in a mesh network, since the very nature of the mesh enables multiple routes across the network to be defined.

One example of a modified SDN controller that controls clock synchronisation signal routing is described in a paper entitled "Extending OpenFlow for SDN-enabled Synchronous Ethernet networks" by Rad Suarez, David Rincón, and Sebastià Salient. The paper describes one possible modification of existing SDN controller functionality to enable the propagation of an Ethernet clock synchronisation signal across a software defined network. In an example embodiment of the present invention, this modified SDN controller is further extended in order to select a particular clock synchronisation signal from a plurality of received signals, such as those received from a plurality of antenna beam directions, as described in more detail below.

Figure 3:
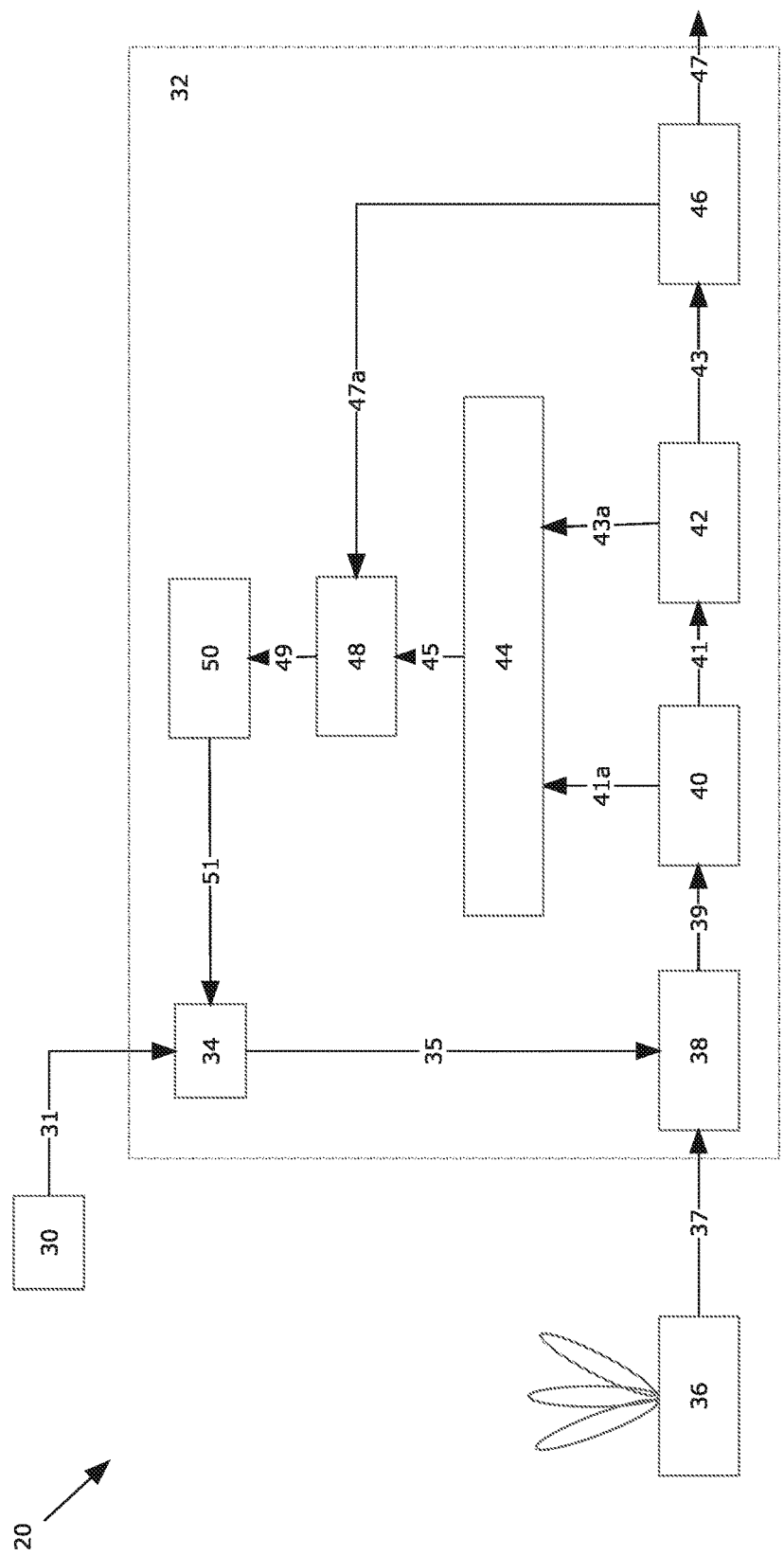
FIG. 3 illustrates a network node embodying one aspect of the present invention.

Synchronisation of an internal clock of a network node 20 with a received master clock signal will now be described with reference to FIG. 3, to 6. FIG. 3 illustrates parts of a network node 20. The network node 3 includes an internal oscillator unit 30 which supplies a reference oscillator signal 31 to a clock signal generator 34. The clock signal generator 34 produces an internal clock signal 35 for use by the network node 20 and for possible transmission to other network nodes, as will be described on more detail below.

The example of FIG. 3 shows a network node 20 having a single processing unit 32 and a single antenna device 36. The antenna device 36, as will be described below, is a beamforming steerable antenna device, which is able to transmit and receive radio frequency signals in distinct signal beams having respective directions. In order to provide the mesh network shown in FIG. 2, each network node 20 needs to include a number of devices that provide the required number of communications directions. A single antenna device 36 and processing unit 32 is shown in FIG. 3 for the sake of clarity. An example network node having multiple processing units 32 and associated antenna units 36 will be described below.

With reference to FIG. 3, the processing unit 32 receives and transmits radio frequency signals from and to the antenna device 36. The antenna device 36 includes a beamforming antenna that is able to communicate in a range of directions centred on a main direction. Each communication direction can provide a respective communication channel, and can be directed to a different network node. Each antenna device 36 receives the radio frequency signal and provides a down-converted baseband signal 37 to a baseband unit 38.

Figure 4:
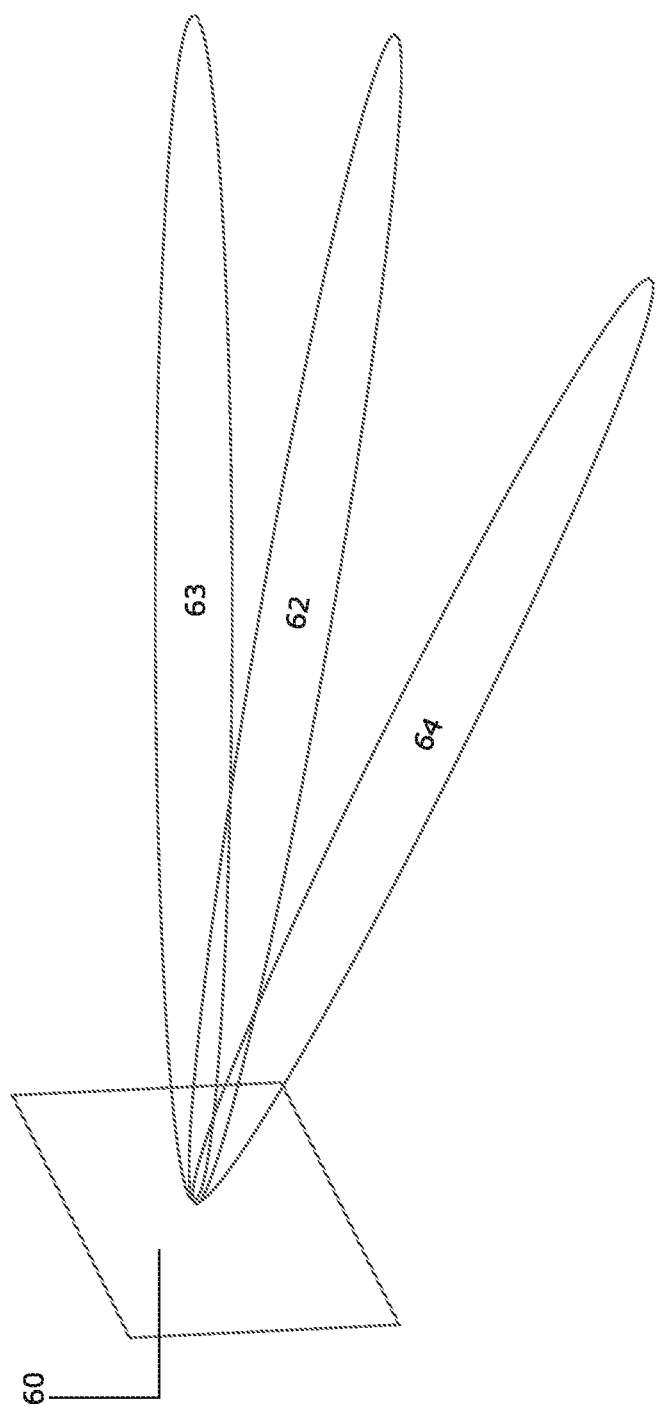
FIG. 4 illustrates a steerable beamforming antenna of the device of FIG. 3

FIG. 4 illustrates schematically a beamforming antenna 60 comprising a two-dimensional array of individual antenna elements. Such a beamforming antenna 60 is able to direct its effective transmission and reception beam pattern. One example of such a beamforming antenna is the well-known "phased array antenna". For example, the antenna may have a central beam 62, and first and second beams 63 and 64 to respective sides of the central beam 62. The antenna 60 may have any number of beams, and hence communications directions, thereby enabling the antenna 60 to direct transmissions to a specific receiving network node, and to receive signals from a selected transmitting network node. A particular beam for transmission or reception is selected by adjusting appropriate parameters of the antenna. For example, for a reception beam, receiver parameters, such as weighting values, may be adjusted so that radio frequency signals are received only from a selected direction, i.e. on a selected signal beam.

When in a receiving mode of operation, the reception characteristics of the antenna elements of the antenna 36,60 are modified according to weighting values determined by the processing unit 32 and supplied to the baseband unit 38, such that the antenna 36,60 receives RF signals from a specific direction (that is, from a specific transmitting network node).

In a transmitting mode of operation, respective drive signals are generated for the antenna elements of the antenna 36, 60. The drive signals are respective modified versions of the RF modulated output signal specific to each antenna element. The output signal may be modified in phase and/or amplitude in order to produce the desired beam pattern, and hence beam direction.

The example network topologies of FIGS. 1 and 2 are simplified inasmuch as the network is arranged on a regular grid pattern, such that network node includes at least one antenna device 36 able to communicate with another antenna device 36 along the centre direction. In a real-world network, the network nodes may be arranged in a more irregular pattern, with the result that an individual antenna device 36 may be able to communicate with a number of different nodes using different respective beam directions.

The processing unit 32 will now be described. The processing unit 32 is provided with a clock generator 34. The processing unit 32 includes the baseband unit 38 which receives the baseband signal 37. The baseband unit 38 operates to synchronise to the start of a packet in the baseband signal and digitises the baseband signal into an encoded data stream 39 for further processing. This processing of the baseband signal 37 requires a clock signal 35.

Figure 5:
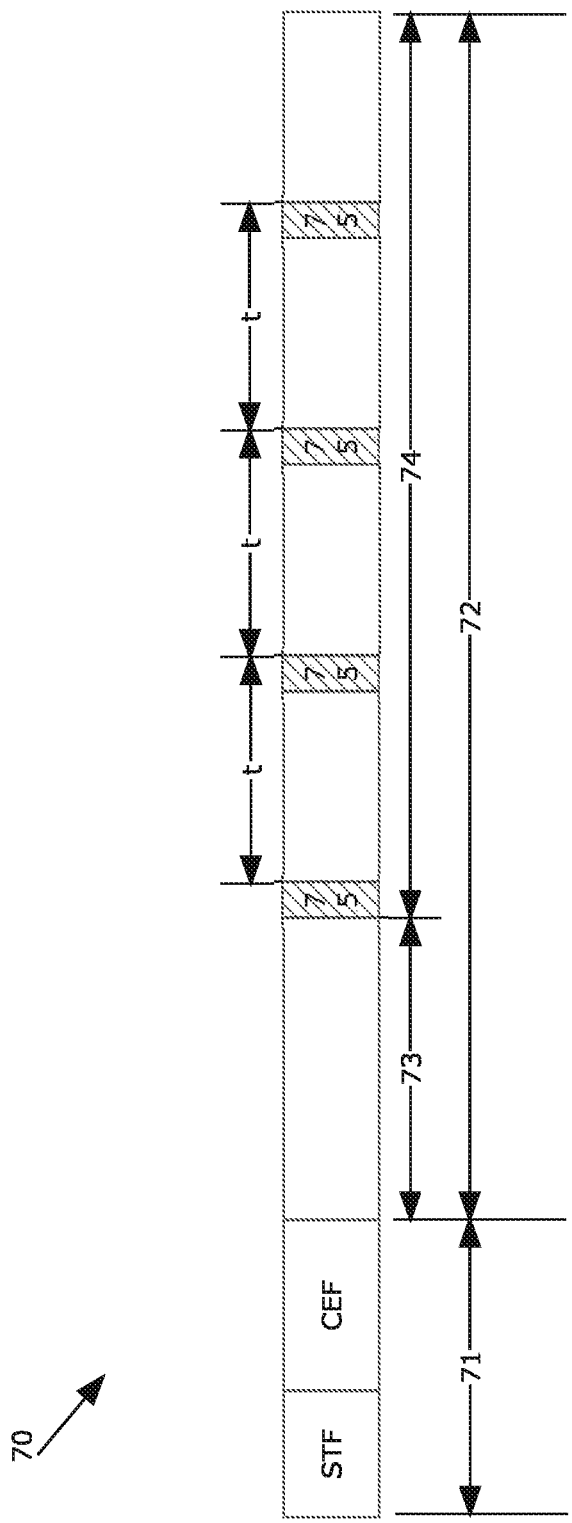
FIG. 5 shows a simplified PHY packet structure.

The data stream 39 represents a series of data packets, a very simplified structure of which is illustrated in FIG. 5. A data packet 70 has a preamble portion 71, and a payload portion 72 which includes a PHY header portion 73, and a packet portion 74. The packet portion includes synchronisation indicators 75 which are spaced at regular times through the packet portion 74. As is well known and understood, and defined in the relevant IEEE specifications, the preamble of the data packet is used to enable a first estimate of frequency and phase of the data packet to be identified. The preamble includes short training field (STF) portion and a channel estimate field (CEF) portion, the structures of which are well known and understood, particularly with reference to the appropriate standard(s).

The PHY header portion 73 includes information about the modulation and coding scheme used for the packet portion 74. The packet portion 74 also includes a media access control (MAC) header portion and a user data portion. The MAC header portion contains data identifying the source and destination for the user data portion. The user data portion contains at least one user data packet, and possibly associated additional control or header data, for delivery to the ultimate destination.

In one example of an aspect of the present invention, the payload portion 72 is a dedicated synchronisation payload, and so contains only the synchronisation indicators 75, and does not contain data items for transfer through the node.

In such an example, the network node may be configured to switch to the synchronisation signal at regular intervals, for example every 1 millisecond, or according to an appropriate predetermined timing schedule, in order that the local clock can remain synchronised with the master clock. Where the reception direction for the beam carrying the synchronisation signal is different to that of the current data transfer beam, the network node switches between data transfer and synchronisation beams appropriately.

In a preferred example, the network node that is responsible for transmitting the clock synchronisation signal will adhere to the predetermined timing schedule, and will adjust the transmission parameters of its beamforming steerable antenna so that the synchronisation transmission beam is transmitted in the correct direction and at the appropriate time. The adherence to the predetermined timing schedule both the transmitting network node and the receiving network node allows for the regular synchronisation of the clock signals.

For the case where the synchronising signal is a dedicated signal, the low amount of data (only the synchronisation indicators) being transferred allows for the use of a modulation and coding scheme that maximises the range of the synchronisation signal. The positions of the synchronisation indicators do not depend upon the modulation and coding scheme used.

In another example of an aspect of the present invention, the payload portion 72 includes data items to be transferred by the node, and includes the synchronisation indicators 75.

In another example, timing information may be derived from detected changes in the data modulation constellation, or by any other suitable technique.

Returning to FIG. 3, a preamble processing unit 40 receives the data stream 39 and identifies and processes the preamble portion (71, FIG. 5) of each data packet in the data stream 39. The preamble processing unit 40 produces an initial estimate of the relative phase difference between the internal reference clock signal and the incoming data stream 39 using the short training field and channel estimate fields in accordance with the appropriate techniques specified in the standard. The preamble processing unit 40 outputs a first phase signal 41*a*, and passes the remainder of the data packet 41 (that is, the payload portion 72, FIG. 5) to a payload processing unit 42.

The payload processing unit 42 demodulates and decodes the payload portion, thereby producing a series of data packets 43 which is supplied to a media access controller (MAC) 46. The payload processing unit 42 generates a second phase signal 43*a* relating to the relative phase of the reference clock 35 to the encoded reference signal of the payload. The second phase signal 43*a* is more precise than the first phase signal 41*a*. The second phase signal 43*a* also provides a running estimate of phase changes with respect to the reference clock 35 during the payload portion of the incoming data stream. The payload processing unit 42 identifies the synchronisation indicators (75, FIG. 5) in the payload, and compares the timing of these indicators with the local clock signal to produce the second phase signal 43*a*.

A detection unit 44 receives the first phase signal 41*a* from the preamble processor 40, and the second phase signal 43*a* from the payload processing unit 42. The detection unit 44 combines the first and second phase signals 41*a* and 43*a* and generates a signal 45 which relates the phase changes between the data stream and the internal reference clock. In summary, the detection unit 44 determines the difference between the reference clock and the carrier frequency (the "carrier frequency offset (CFO)"), and determines the difference between the reference clock and the sampling frequency (the "sampling frequency offset (SFO)").

The detection unit 44 outputs the indicator signal 45 to a computational unit 48 which in turn is able to process the indicator signal 45, in order to create a long term adjustment signal 49 for phase offset adjustment of the reference clock that doesn't interfere with the baseband unit 38, the preamble processor 40, and the payload processing unit 42 data processing chain.

The MAC 46 determines routing decisions for the data packet from the header portion of the packet, and outputs each data packet appropriately, as an output data stream 47. In addition, the MAC 46 produces a signal 47a used by the computational unit 48 to indicate valid inclusion of that signal from data derived from the packet header. In such a manner, the computational unit 48 is able to use a synchronisation signal from the correct source, as determined by the MAC 46.

The long term adjustment signal 49 is output to a phase processing unit 50. The phase processing unit 50 determines how the clock generator unit 34 must be adjusted in order to reduce the phase difference between the internal clock signal 35 and the data stream 37. The phase processing unit 50 outputs a control signal 51 to the clock generator 34. The clock generator 34 adjusts the local clock signal 35 for the processing unit 32 so that the phase difference values originating from the CFO and SFO and computed by the detection unit 44, the computational unit 48 and the phase processing unit 50 tend to zero.

The local clock signal 35 is adjusted at a slower rate of change than the incoming data stream required offset adjustments, and the adjustment is controlled such that the local clock signal is in a holdover and remains within appropriate tolerance even if a synchronisation signal is not available.

Figure 6:
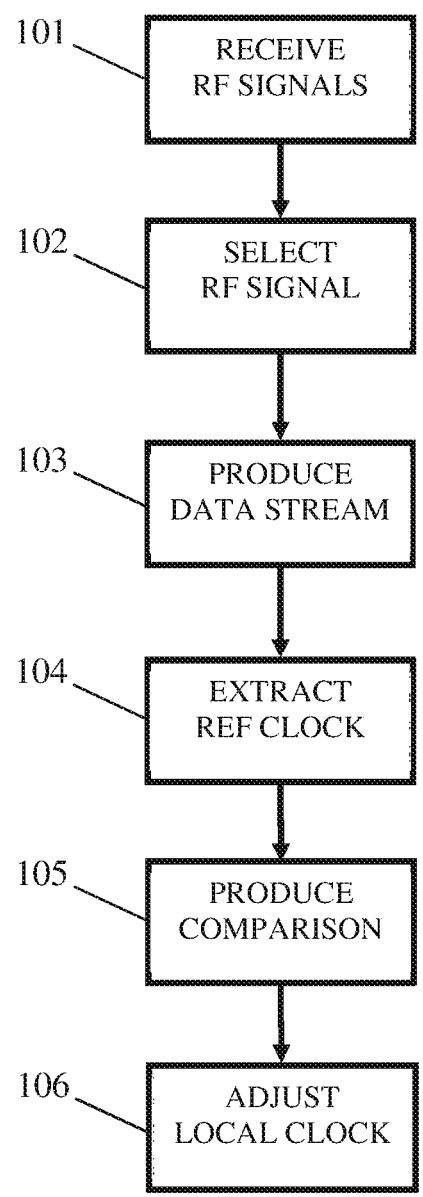
FIG. 6 is a flowchart showing steps in a method embodying one aspect of the present invention.

FIG. 6 illustrates steps of synchronising the local clock with the selected received synchronisation signal. Such a method comprises the steps of:

receiving 101 a plurality of radio frequency signals at a beamforming steerable antenna having reception parameters that define a reception direction for the antenna, each received radio frequency signal having a direction;

selecting 102 one of the received radio frequency signals as a synchronisation signal by adjusting the reception parameters of the steerable antenna;

producing 103 a digital data stream from the synchronisation signal using a local clock signal;

extracting 104 a reference clock signal from the digital data stream;

producing 105 a reference comparison value by comparing the reference clock signal with the local clock signal; and adjusting 106 the local clock signal in dependence upon the reference comparison value.

Figure 7:
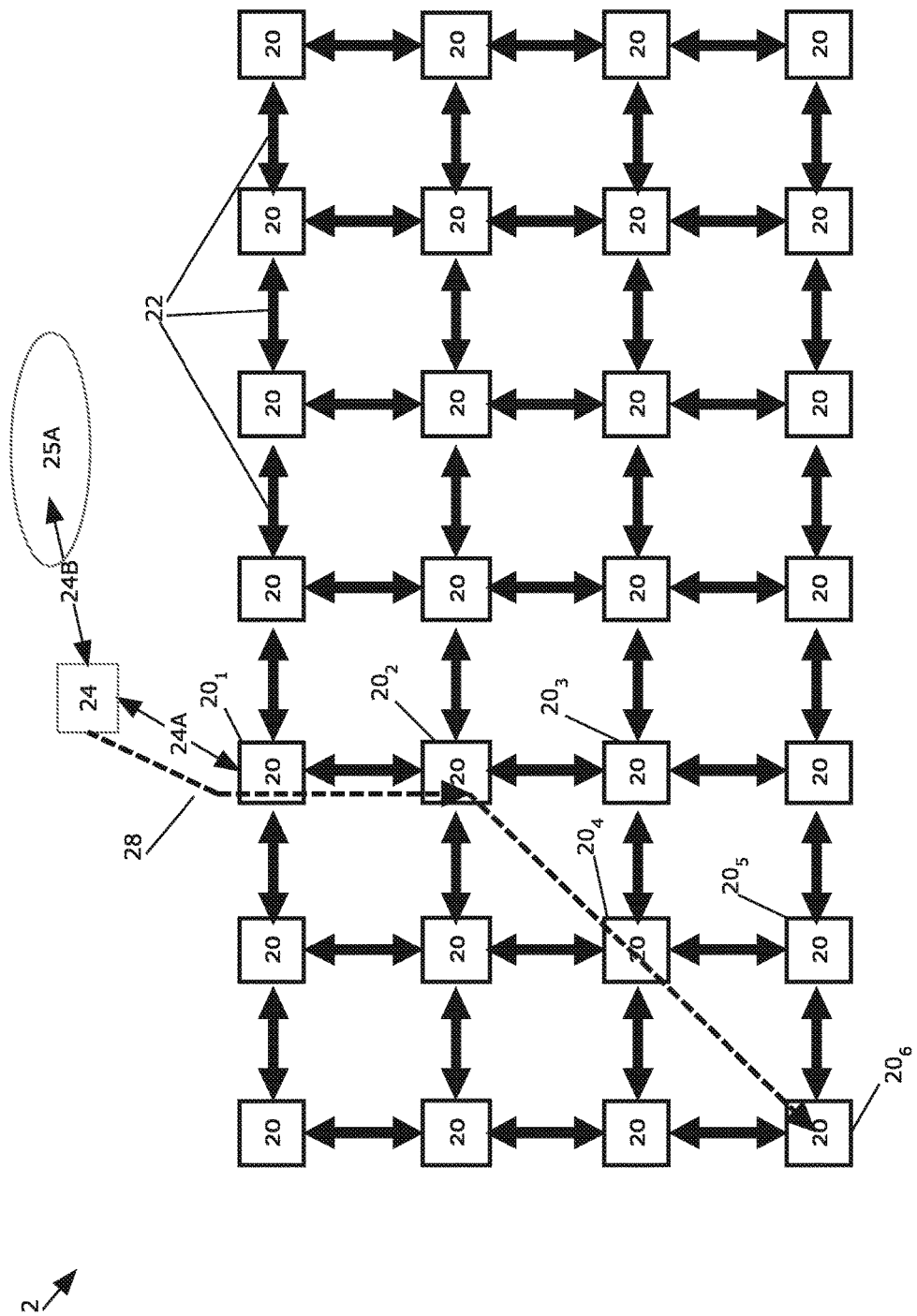
FIG. 7 illustrates another example of clock synchronisation across a wireless mesh communications network.

FIG. 7 illustrates the network 2 in which the master clock signal is transmitted from the second network node 20₂ directly to the fourth network node 20₄, and then from the fourth network node 20₄ to the destination sixth network node 20₆. In example of FIG. 7, the third and fifth network nodes 20₃ and 20₅ are removed from the clock sync path 28. The second and fourth network nodes 20₂ and 20₄ make use of a beamforming steerable antenna in one of the radio frequency channels in order to direct the master clock signal appropriately using dedicated synchronisation signal beams. In one example, this direct communication is possible because the beam used to transmit the master clock signal can have a lower data rate, and hence longer range, than the more usual communication links 22 between adjacent network nodes 20. This extended range allows the master clock signal to be transferred out of the usual network communications directions.

Figure 8:
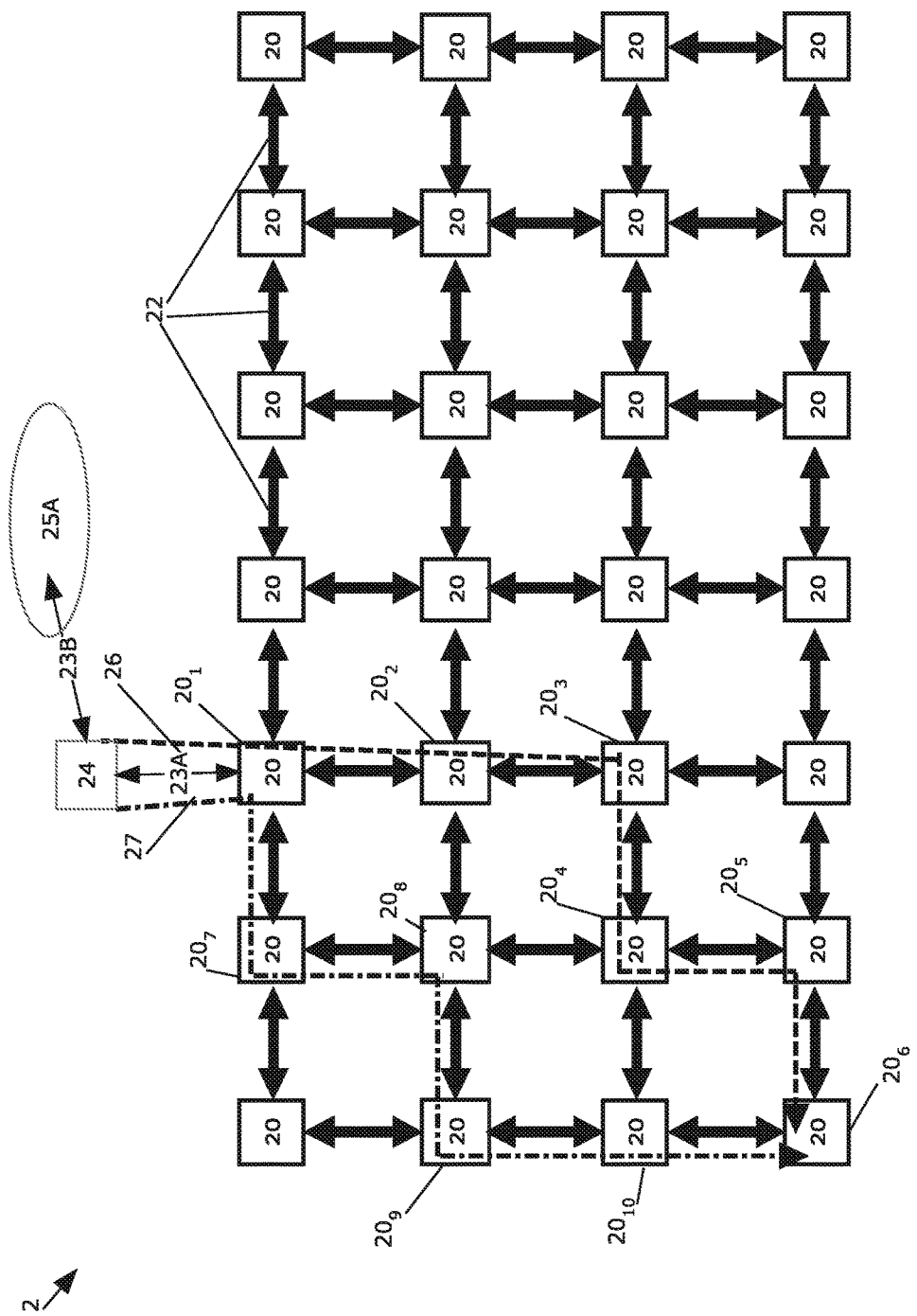
FIG. 8 illustrates another example of clock synchronisation across a wireless mesh communications network.

The provision of a clock sync path across a mesh network as described above enables the dynamic adaptation of the path. In addition, multiple clock sync paths may be defined when appropriate. For example, FIG. 8 illustrates the network 2 from FIG. 2 in which the clock sync path 26 is defined from a first network node 20₁ to a sixth (destination) network node 20₆. A second clock sync path 27 may be defined from the POP node 24 to the sixth network node 20₆. This second clock sync path 27 is routed through the first network node 20₁ via seventh, eighth, ninth and tenth network nodes 20₇, 20₈, 20₉, 20₁₀ to the destination sixth node 20₆. The routing of the clock signal is enabled by the use of the steerable beamforming antenna unit 36 of each network node 20. As will be described below, it is preferable for at least some of the network node to include multiple processing units 32 and antenna devices 36 to provide the required number of communication directions.

The second clock sync path 27 provides an alternative route for the synchronisation of the destination network node 20₆. However, the destination network node 20₆, needs only a single master clock reference, and so the destination network device 20₆ determines which of the received master clock signals, received via the first and second clock signal paths 26 and 27, is to be used. This decision may be made by a suitable adapted SDN controller, or locally in the network node. A switching unit in each node 20 is used to direct the reference clock signals appropriately.

The network node 3 of FIG. 3 was illustrated with a single processing unit 32 and associated antenna device 36, and represents a simplified node. For use in a mesh network, at least some of the network nodes need to have a plurality of interconnected processing units 32, which are connected with respective antenna devices 36.

Figure 9:
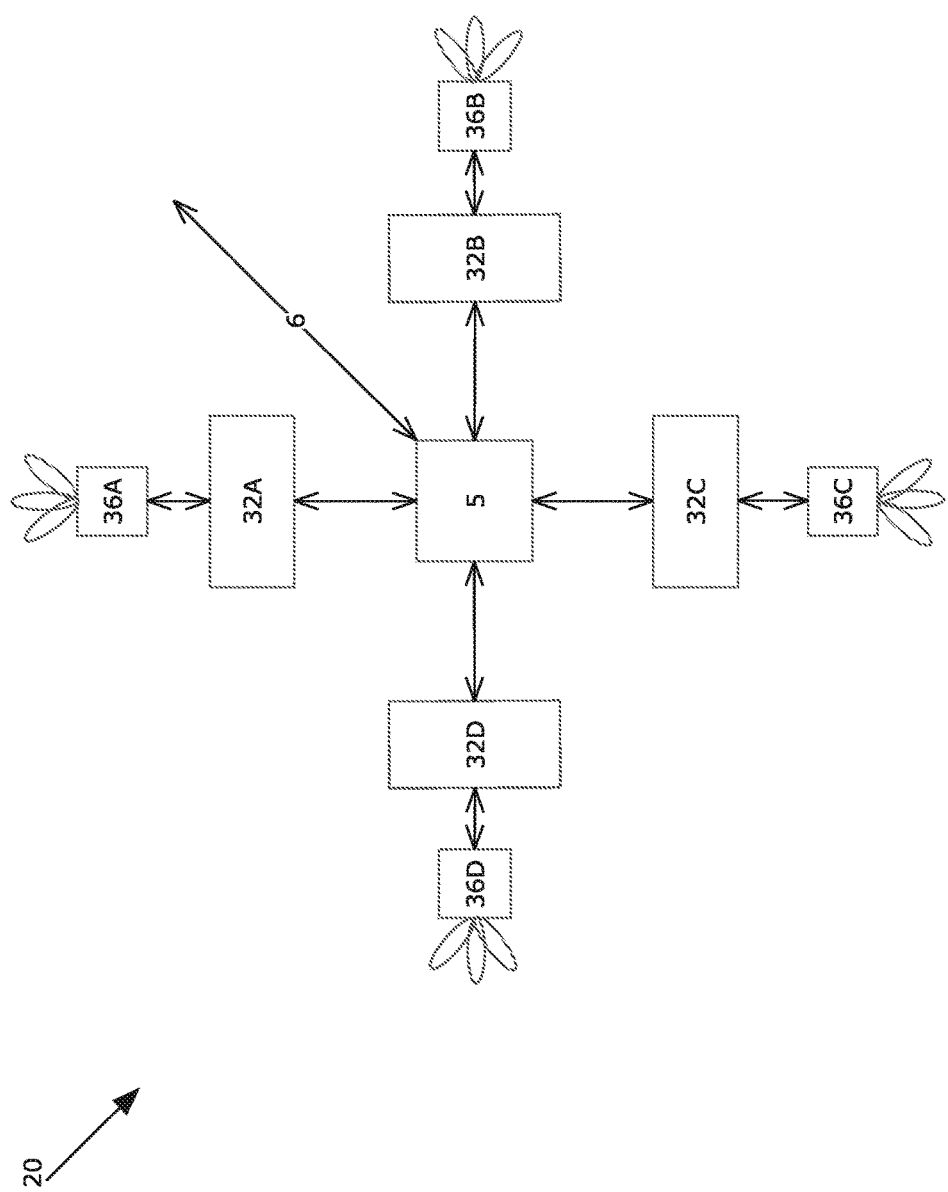
FIG. 9 illustrates a network node embodying another aspect of the present invention.

FIG. 9 illustrates a network node device 20 having four processing units 32A, 32B, 32C, 32D with respective associated antenna devices 36A, 36B, 36C, 36D. Such a network node device provides a desired number of communications directions. The network node 20 of FIG. 9 includes, in this example, four processing units 32 for the processing of received radio frequency signals. A network node 20 may include any appropriate number of processing units 32.

The processing units 32A, 32B, 32C, 32D are interconnected by a switch unit 5 which operates to transfer data packets between the processing units 32A, 32B, 32C, 32D. In such a manner data packets can be routed through the network node 20. In addition, the switch unit 5 is connected with a local connection 6, for example a cell of a cellular communications network, or other local device.

Although the switch unit 5 is used for switching data packets through the network node for routing across the network, in the context of the present invention, it is the routing of clock synchronisation signals that is of interest. In this regard, the switching unit 5 is operable to switch such synchronisation signals between the processing units 32A, 32B, 32C, 32D.

Figure 10:
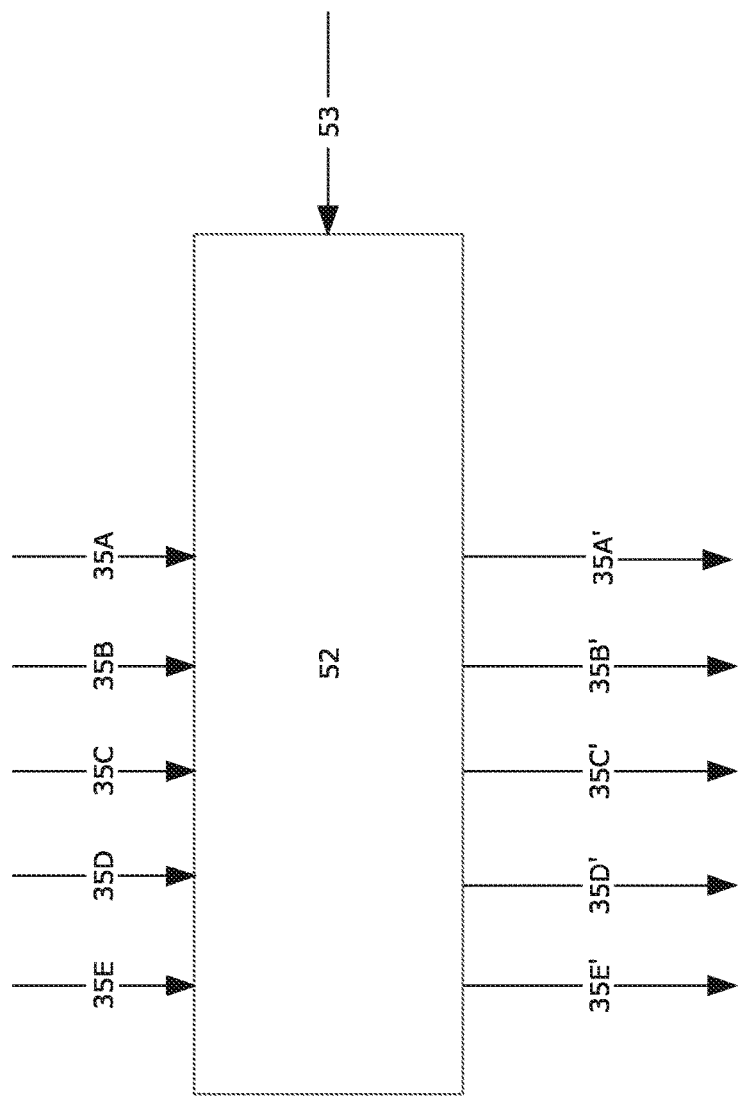
FIG. 10 illustrates part of the network node of FIG. 9.

FIG. 10 illustrates a part of the switching unit 5 responsible for the routing of synchronisation signals between the processing units 32A, 32B, 32C, 32D. The switching unit 5 includes a non-blocking multiplexer 52 that is able to connect any of its inputs to any of its outputs, and to make multiple connections at any given time. In the present example, the multiplexer 52 is connected to receive respective outputs 35A, 35B, 35C, 35D of the clock generators of the processing units 32A, 32B, 32C, 32D. In addition, the multiplexer is connected to receive an external clock synchronisation signal 35E from the local connection 6. This external signal 35E may be a SyncE (Ethernet sync) signal. The multiplexer 52 provides a series of outputs 35A', 35B', 35C', 35D', which provide the clock signals for use by the respective baseband units of the processing units 32. In addition, an external synchronisation signal output 35E' is provided for supply to the locally connected external device. The multiplexer 52 has a control signal input 53 which is used to determine to which of the outputs the inputs are connected. The control of the multiplexer may be performed locally by the node itself or by a central control unit, such as a software defined network (SDN) controller.

Figure 11:
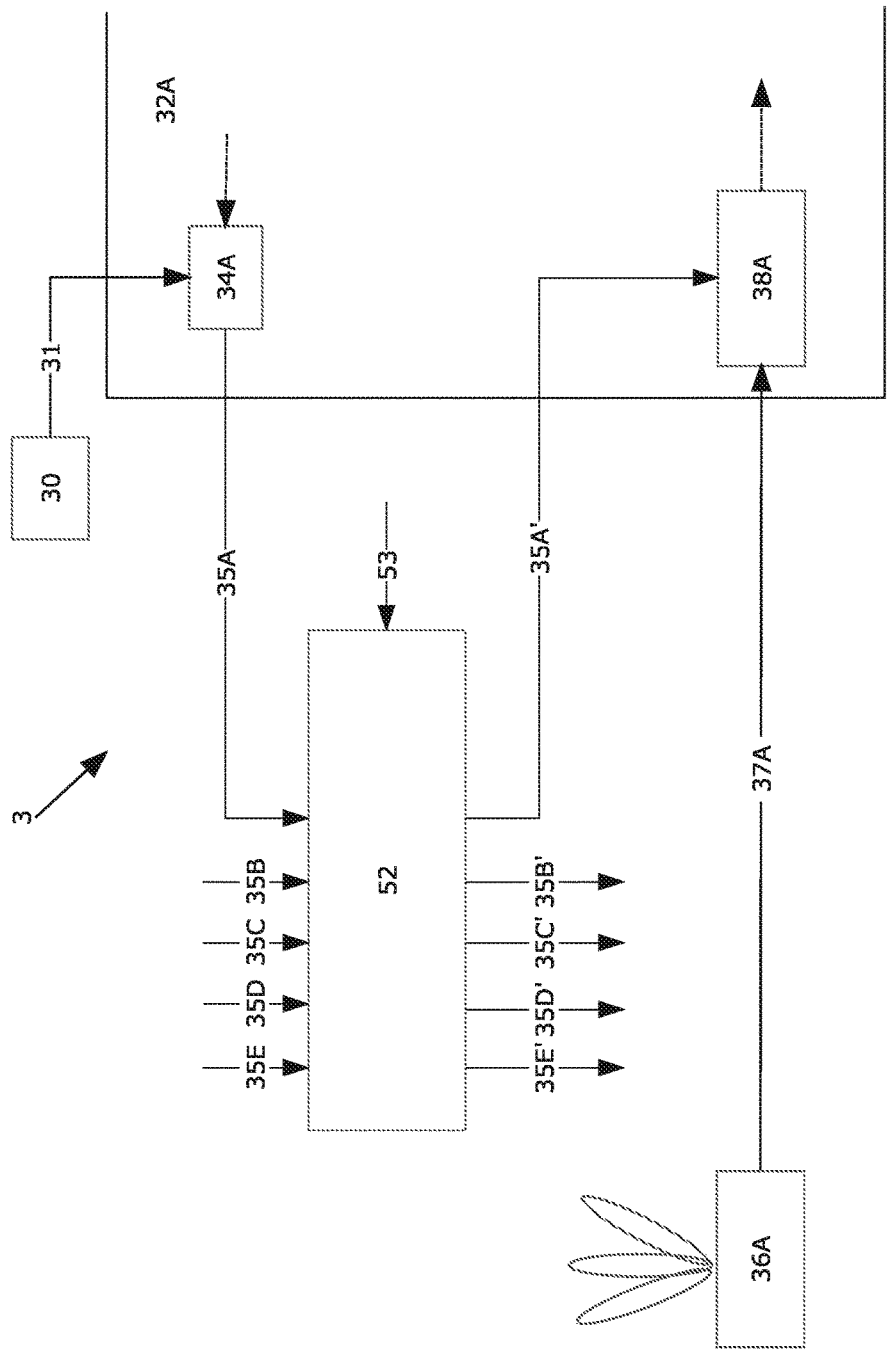
FIG. 11 illustrates the part of FIG. 10 in combination with parts of the network node of FIG. 9.

FIG. 11 illustrates the multiplexer 52 connected with parts of one processing unit 32A, and shows how the clock generator signal of that processing unit is routed through the multiplexer. The baseband unit 38A makes use of the clock signal 35A' supplied from the multiplexer 52, and this clock signal 35A' is used in the adjustment of the local clock signal 35A. Accordingly, the local clock signal 35A is able to be synchronised with any of the synchronisation signals received by any of the processing units of the network node.

In addition, any of the multiplexer outputs 35A',35B', 35C', 35D' can be transmitted as a clock synchronisation signal from any of the antenna units, on any appropriate beams. The clock synchronisation signal may be part of a data transfer signal, or may be dedicated clock synchronisation signals.

The reference clock signals may be communicated over dedicated clock transmission steerable directional radio frequency beams from the antenna units of the network node 20. In the exemplary case of the sync path 26 of FIG. 2, the first to sixth network nodes are instructed to transmit a reference clock beam, and to receive a reference clock signal on a particular beam so as to construct the clock sync path 26. In an alternative example, the clock synchronisation may be derived from a data transfer signal beam. The routing of the clock signal from the POP node 24 to the destination node is achieved by the control of the multiplexer 52 in each network node.

Figure 12:
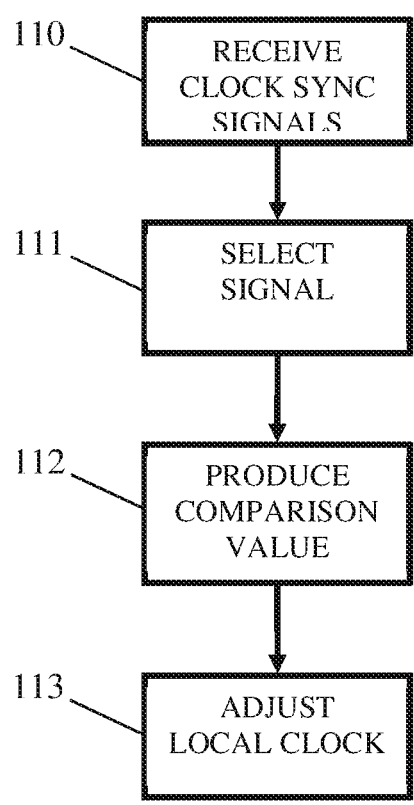
FIG. 12 is a flowchart showing steps in a method embodying another aspect of the present invention.

FIG. 12 illustrates steps in a method according to another aspect of the present invention, in which a network node: receiving 110 a plurality of clock synchronising signals, selecting 111 one of the received clock synchronising signals as a reference clock signal, producing 112 a reference comparison value by comparing the reference clock signal with a local clock signal, and adjusting 113 the local clock signal in dependence upon the reference comparison value.

Figure 13:
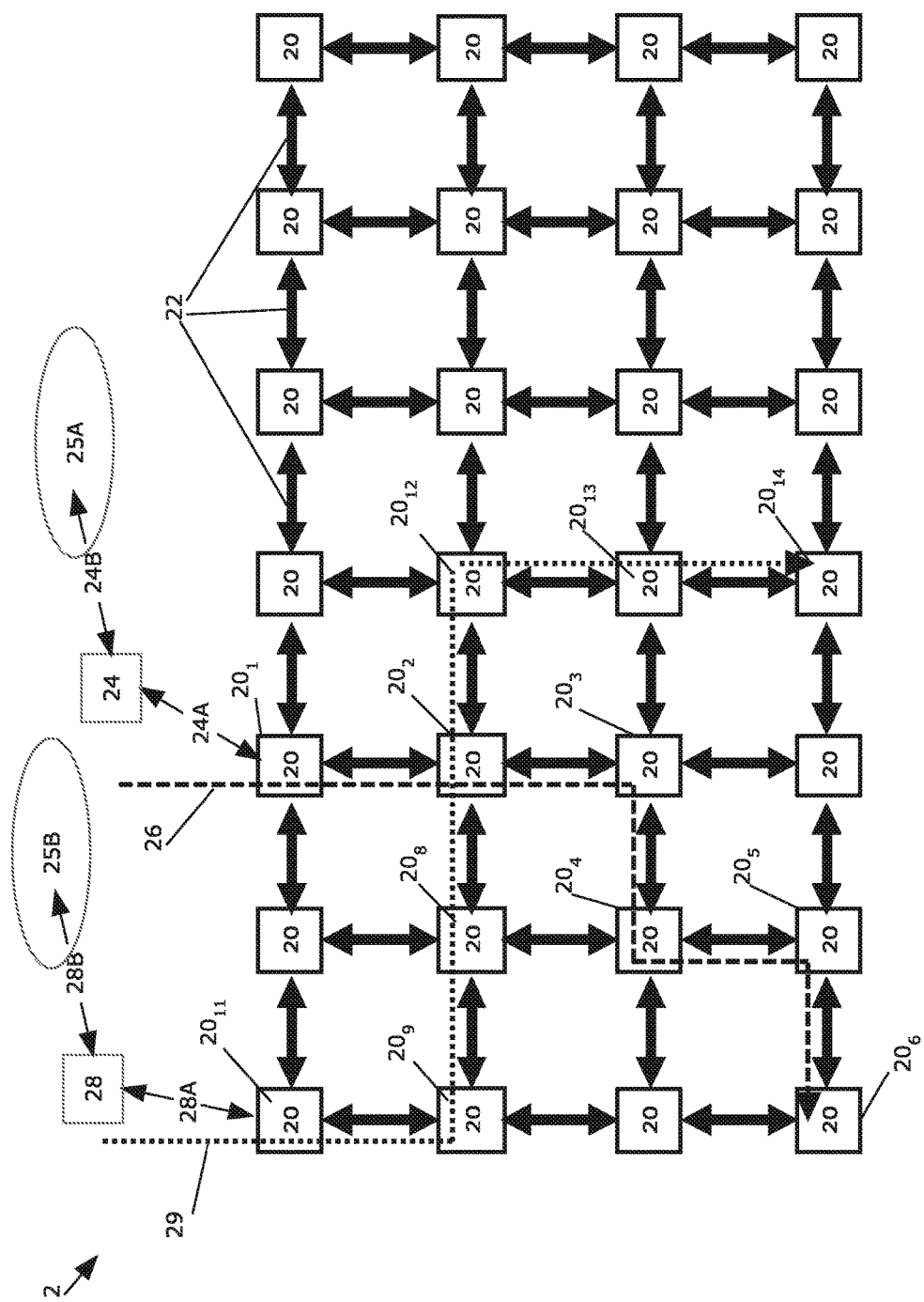
FIG. 13 illustrates another example of clock synchronisation across a wireless mesh communications network in accordance with another aspect of the present invention.

The network may have more than one POP node. FIG. 13 illustrates the network 2 of FIG. 2 having the first POP node 24 which transmits the first master clock signal over the clock sync route 26, as described with reference to FIG. 2. The network of FIG. 13 also includes a second POP node 28 which transmits a second master clock signal to a second destination network node, in this example a fourteenth node $20_{14}$. The second POP node 28 defines a second clock signal route 29, which it passes through eleventh, ninth, eighth, second, twelfth, thirteenth and fourteenth network nodes $20_{11}$, $20_9$, $20_8$, $20_2$, $20_{12}$, $20_{13}$, and $20_{14}$. The second network node $20_2$, in this example, receives two clock reference signals from the first and second POP nodes 24 and 28, respectively. As such, the second network node $20_2$ may use either master clock signal, and can be controlled locally or from a central SDN controller to determine which of the clock signals to use.

Figure 14:
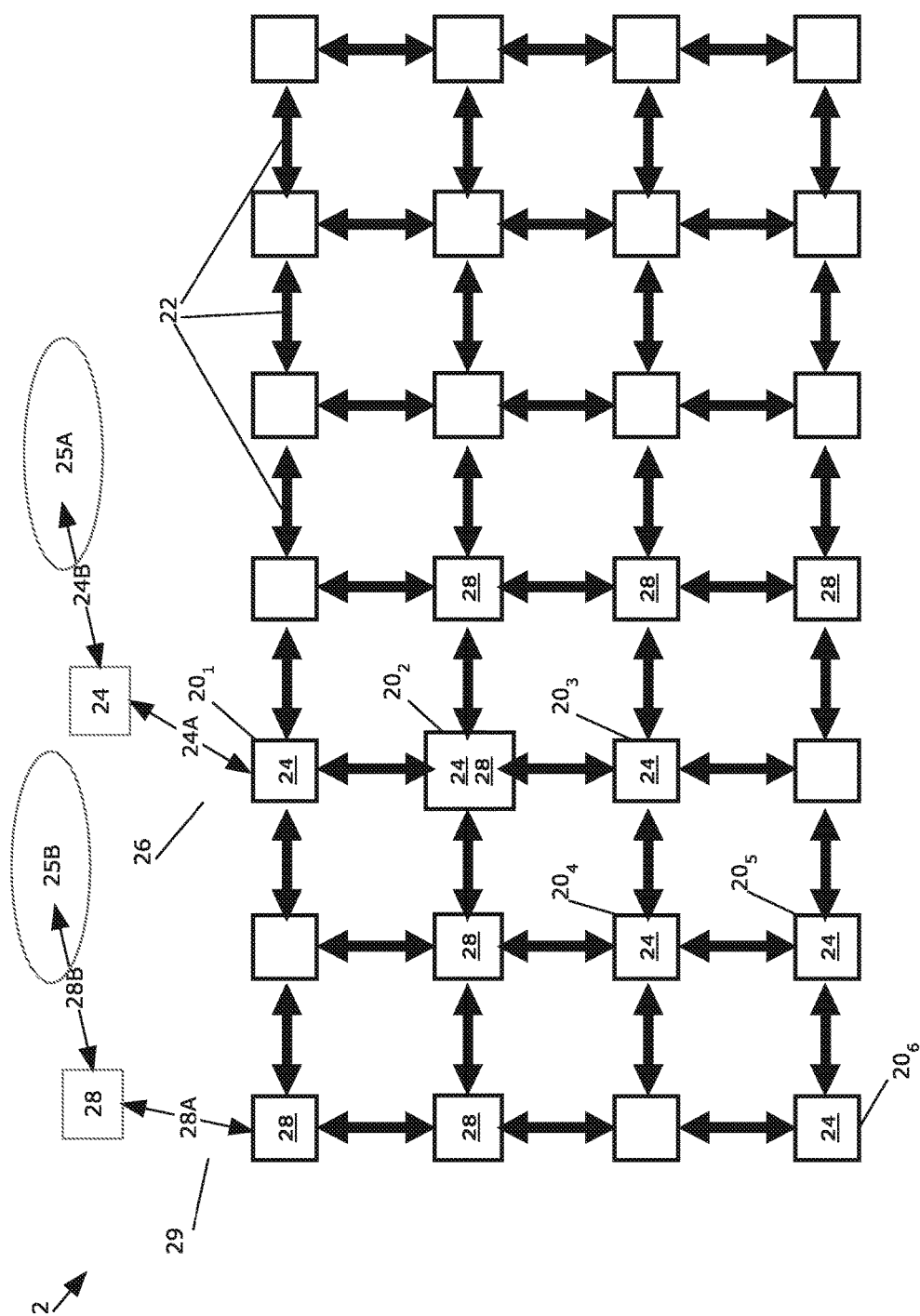
FIG. 14 illustrates clock synchronisation according to the example of FIG. 12.

FIG. 14 illustrates the resulting clock distribution. The first second third, fourth, fifth and sixth network nodes $20_1$, $20_2$, $20_3$, $20_4$, $20_5$ and $20_6$ make use of the first master clock signal from the first POP node 24, and are therefore in a first clock region 24. The eighth, ninth, eleventh, twelfth, thirteenth, and fourteenth network nodes $20_8$, $20_9$, $20_{11}$, $20_{12}$, $20_{13}$ and $20_{14}$ make use of the second master clock signal from the second POP node 28, and are therefore in a second clock region 28. As such, using first and second clock sources and respective routes across the network, it is possible to define different clock regions for different purposes.

Figure 15:
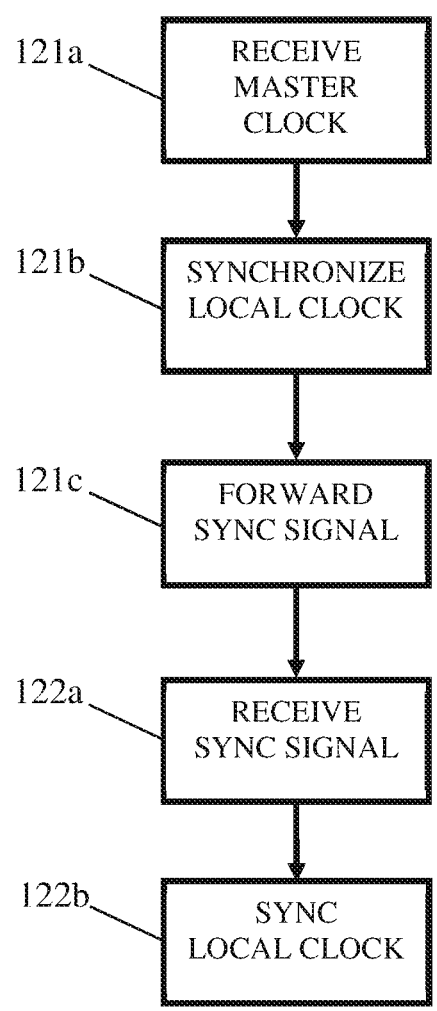
FIG. 15 is a flowchart showing steps in a method embodying another aspect of the present invention.

Steps in a method embodying this aspect of the present invention are illustrated in FIG. 15, and comprise:
at a first network node:
a. receiving 121*a* a master clock signal;
b. synchronising 121*b* a local clock signal of the first network node with the master clock signal; and
c. forwarding 121*c* a first synchronisation signal to a second network node, the first synchronisation signal being dependent upon on or both of the local clock signal of the first node and the master clock signal;
at a second network node:
d. receiving 122*a* the first synchronisation signal from the first network node; and
synchronising 122*b* a local clock signal of the second network node with the first synchronisation signal, the first and second network nodes thereby forming a first clock region of the wireless mesh network.

Accordingly, embodiments of the various aspects of the present invention are able to provide improved techniques for the synchronisation of local clock signals of network nodes across a wireless mesh network having a plurality of such nodes.

In one example, an embodiment of the present invention is suitable for providing synchronising clock signals for different network slices. Network slicing is a concept in which a single hardware network is utilised by different operators using partitioning into multiple virtual networks allowing the operator to offer optimal support for different types of services for different types of customer segments. The key benefit of network slicing technology is that it enables network access as a service, which enhances operational efficiency while reducing time-to-market for new services. The network slices may be on any type of basis. For example, characteristics including latency or bandwidth requirements may be used to define different network slices. Other examples include time and location slicing. Network slices are isolated from each other in the control and user planes, and so embodiments of the present invention enable provision of the user experience of the network slice will be the same as if it was a physically separate network.

The invention claimed is:

1. A method of frequency synchronising a local clock signal with a reference clock signal in a first network node of a wireless mesh communications network which includes a plurality of such network nodes interconnected by another plurality of wireless communications links, the method comprising, at the first network node:
 receiving a plurality of radio frequency signals at a beamforming steerable antenna having reception parameters that define a reception direction for the beamforming steerable antenna, each received radio frequency signal having a direction;
 selecting one of the received radio frequency signals as a synchronisation signal by adjusting the reception parameters of the beamforming steerable antenna;
 producing a digital data stream from the synchronisation signal using a local clock signal;
 extracting a reference clock signal from the digital data stream;
 producing a reference comparison value by comparing the reference clock signal with the local clock signal; and
 adjusting a frequency of the local clock signal in dependence upon the reference comparison value;

wherein selecting one of the received radio frequency signals comprises adjusting the reception parameters of the beamforming steerable antenna in accordance with a predetermined timing schedule, and wherein the data stream comprises a plurality of data packets, each data packet including a preamble portion, and a payload portion, and wherein extracting a reference clock signal comprises:

extracting clock signal information from the preamble portion of a data packet to provide a preamble clock signal, and extracting clock signal information from the payload portion of the data packet to provide a payload clock signal, and wherein producing a reference comparison value comprises:

comparing the preamble clock signal with the local clock signal to produce a first comparison value;

comparing the payload clock signal with the local clock signal to produce a second comparison value;

combining the first and second comparison signals to produce the reference comparison value.

2. A method as claimed in claim 1, wherein adjusting the local clock signal is determined by the source of the synchronisation signal.

3. A method as claimed in claim 1, wherein selecting one of the received radio frequency signals is determined by the source of that radio frequency signal.

4. A method as claimed in claim 1, wherein selecting one of the received radio frequency signals is determined by the source of that radio frequency signal, and wherein the source of the radio frequency signal is determined by reference to media access control (MAC) data.

5. A method as claimed in claim 1, wherein selecting one of the received radio frequency signals comprises adjusting the reception parameters of the beamforming steerable antenna in accordance with a predetermined timing schedule.

6. A method as claimed in claim 1 further comprising, at a second network node of the wireless mesh communications network:

selecting a clock signal;

generating a radio frequency clock synchronisation signal in dependence upon the selected clock signal;

transmitting the radio frequency clock synchronisation signal to the first network node from a beamforming steerable antenna having transmission parameters which define a transmission direction to the first network node, such transmission including adjusting the transmission parameters of the beamforming steerable antenna, wherein adjustment of the transmission parameters is performed in accordance with the predetermined timing schedule.

7. A method as claimed in claim 1, wherein a preamble portion includes a channel estimation field and a short training field, and wherein the clock signal information is extracted from the channel estimation field and short training field.

8. A method as claimed in claim 1, wherein the synchronisation signal is a data transfer signal.

9. A method as claimed in claim 1, wherein the synchronisation signal is a dedicated clock synchronisation signal.

10. A method as claimed in claim 9, wherein the dedicated clock synchronisation signal is selected at predetermined time intervals.

11. A method as claimed in claim 9, wherein the dedicated clock synchronisation signal is selected at predetermined time intervals, and, wherein selection of the received radio frequency signal is performed according to a timing schedule defined by the central controller.

12. A method as claimed in claim 9, wherein the dedicated clock synchronisation signal is selected at predetermined time intervals, and, wherein the central controller is a software defined network controller.

13. A method as claimed in claim 9, wherein the dedicated clock synchronisation signal is selected at predetermined time intervals, and, wherein selection of the received radio frequency signal is performed according to a timing schedule defined by the central controller, wherein selecting the synchronisation signal includes selecting respective radio frequency signals for the beamforming steerable antennas.

14. A method as claimed in claim 1, wherein the dedicated clock synchronisation signal employs a modulation and coding scheme that enables the dedicated clock synchronisation signal to have greater range than a data transfer signal.

15. A method as claimed in claim 1, wherein selecting one of the received radio frequency signals is controlled by a central controller of the wireless mesh communications network.

16. A method as claimed in claim 1, wherein the network node comprises a plurality of beamforming steerable antennas having respective reception parameters that define respective reception directions for the beamforming steerable antennas, and wherein selecting the synchronisation signal includes selecting one radio frequency signal received by one of the plurality of beamforming steerable antennas.

17. A network node for use in a wireless mesh communications network which includes a plurality of such network nodes interconnected by another plurality of wireless communications links, the network node comprising:

a receiver operable to receive a plurality of radio frequency signals at a beamforming steerable antenna having reception parameters that define a reception direction for the beamforming steerable antenna, each received radio frequency signal having a direction;

a controller operable to select one of the received radio frequency signals as a synchronisation signal by adjusting the reception parameters of the beamforming steerable antenna;

a baseband unit operable to produce a digital data stream from such a synchronisation signal using a local clock signal; and a processing unit operable to extract a reference clock signal from such a digital data stream, and to produce a reference comparison value by comparing the reference clock signal with such a local clock signal, and to adjust a frequency of the local clock signal in dependence upon such a reference comparison value;

wherein the data stream comprises a plurality of data packets, each data packet including a preamble portion, and a payload portion, and wherein extraction of a reference clock signal includes extraction of clock signal information from the preamble portion of a data packet;

and wherein extraction of the reference clock signal comprises the steps of:

extracting clock signal information from the preamble portion of a data packet to provide a preamble clock signal, and extracting clock signal information from the payload portion of the data packet to provide a payload clock signal, and wherein producing a reference comparison value comprises the steps of:

comparing the preamble clock signal with the local clock signal to produce a first comparison value;

comparing the payload clock signal with the local clock signal to produce a second comparison value;

combining the first and second comparison signals to produce the reference comparison value.

18. A network node as claimed in claim 17, wherein adjustment of the local clock signal is determined by the source of the synchronisation signal.

19. A network node as claimed in claim 17, wherein selection of the radio frequency signal is determined by the source of that radio frequency signal.

20. A network node as claimed in claim 17, wherein selection of the radio frequency signal is determined by the source of that radio frequency signal, and wherein the source of the radio frequency signal is determined by reference to media access control data.

21. A network node as claimed in claim 17, wherein the preamble portion includes a channel estimation field and a short training field, and wherein the clock signal information is extracted from the channel estimation field and short training field.

22. A network node as claimed in claim 17, wherein the synchronisation signal is a data transfer signal.

23. A network node as claimed in claim 17, wherein the synchronisation signal is a dedicated clock synchronisation signal.

24. A network node as claimed in claim 17, wherein the synchronisation signal is a dedicated clock synchronisation signal, and wherein the processing unit is operable to select the dedicated clock synchronisation signal at predetermined time intervals.

25. A network node as claimed in claim 17, wherein the synchronisation signal is a dedicated clock synchronisation signal, and wherein the dedicated clock synchronisation signal employs a modulation and coding scheme that enables the dedicated clock synchronisation signal to have greater range than a data transfer signal.

26. A network node as claimed claim 17, wherein the processing unit is operable to select one of the received radio frequency signals under control of a central controller of the wireless mesh communications network.

27. A network node as claimed in claim 17, wherein the processing unit is operable to select one of the received radio frequency signals under control of a central controller of the wireless mesh communications network, and wherein the processing unit is operable to select the received radio frequency signal according to a timing schedule defined by the central controller.

28. A network node as claimed in claim 17, wherein the processing unit is operable to select one of the received radio frequency signals under control of a central controller of the wireless mesh communications network, and wherein the central controller is a software defined network controller.

29. A network node as claimed in claim 17, further comprising a plurality of beamforming steerable antennas having respective reception parameters that define respective reception directions for the beamforming steerable antennas, and wherein selecting the synchronisation signal includes selecting one radio frequency signal received by one of the plurality of beamforming steerable antennas.

30. A network node as claimed in claim 17, further comprising a plurality of beamforming steerable antennas having respective reception parameters that define respective reception directions for the beamforming steerable antennas, and wherein selecting the synchronisation signal includes selecting one radio frequency signal received by one of the plurality of beamforming steerable antennas, and wherein the processing unit is operable to select respective radio frequency signals for the beamforming steerable antennas.

31. A network node as claimed in claim 17, wherein the controller is operable to adjust the reception parameters of the steerable antenna in accordance with a predetermined timing schedule.

* * * * *